(No Model.)  4 Sheets—Sheet 1.

A. W. ROBINSON.
COMBINED EXCAVATING AND AMALGAMATING MACHINE.

No. 526,056.  Patented Sept. 18, 1894.

WITNESSES:
Edward C. Rowland.
John E. Lacey.

INVENTOR
Arthur W. Robinson
BY Phillips Abbott
ATTORNEY

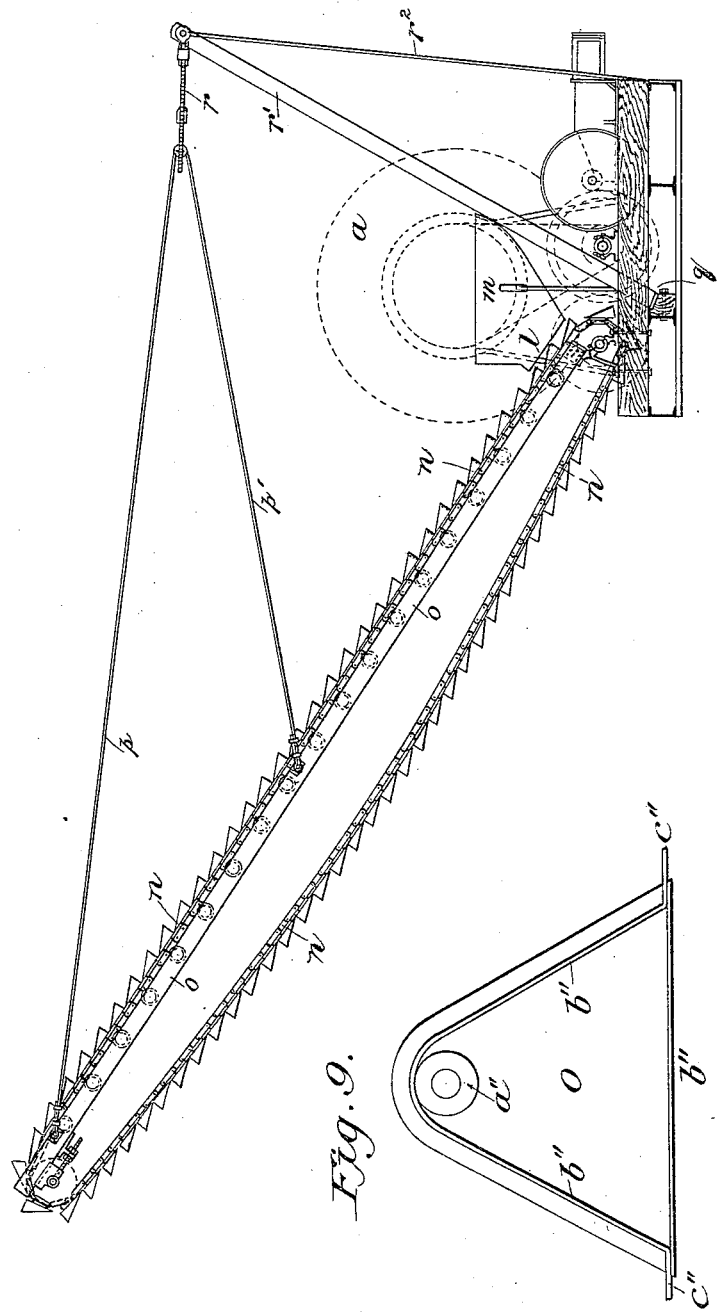

(No Model.) 4 Sheets—Sheet 3.
A. W. ROBINSON.
COMBINED EXCAVATING AND AMALGAMATING MACHINE.
No. 526,056. Patented Sept. 18, 1894.
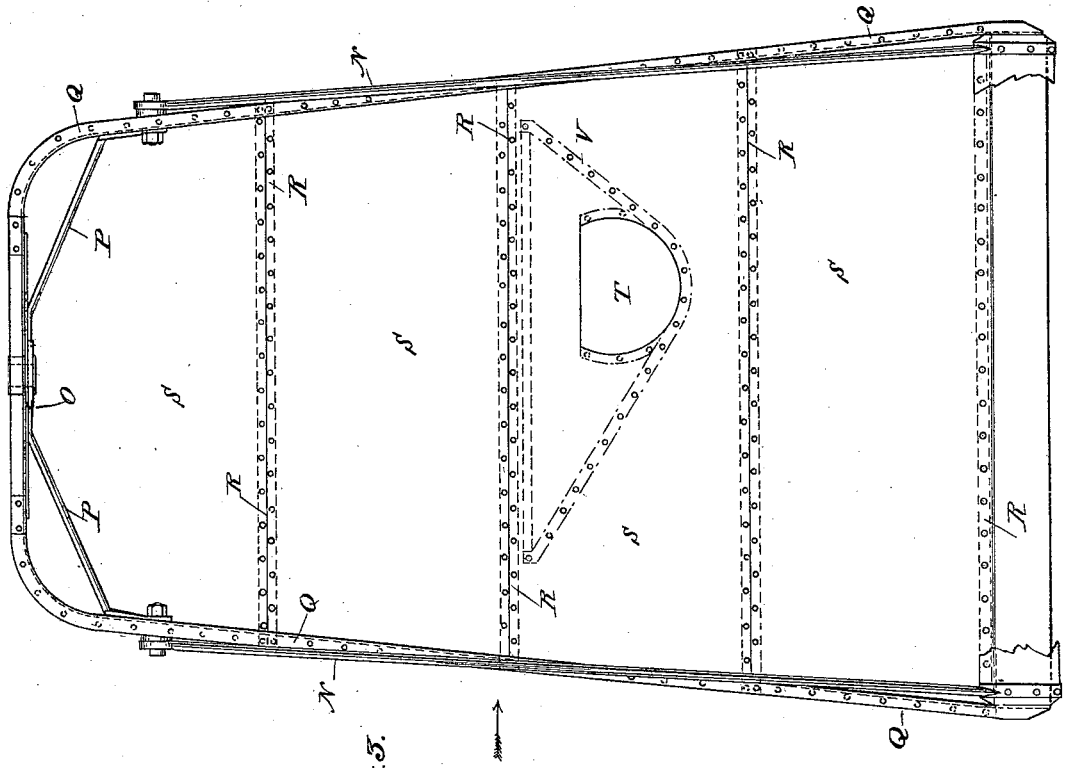
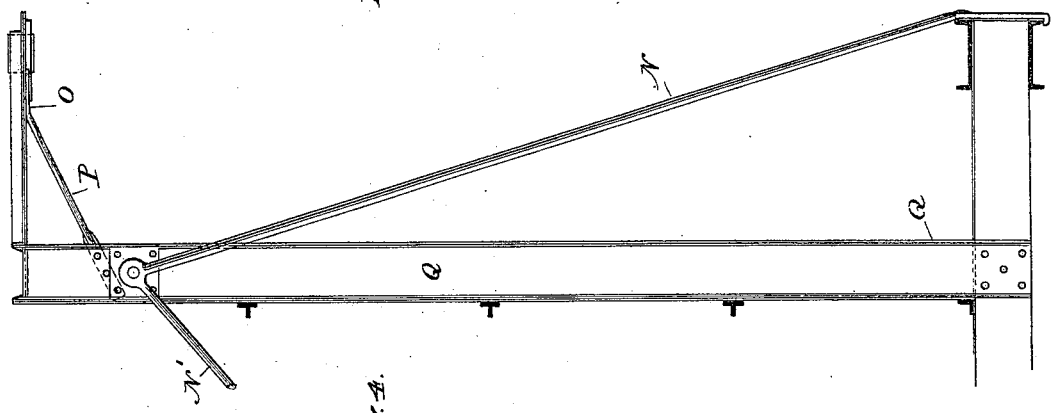
WITNESSES:
Edward C. Rowland.
John E. Lacey.
INVENTOR
Arthur W Robinson
BY
Phillips Abbott.
ATTORNEY (No Model.) 4 Sheets—Sheet 4.

A. W. ROBINSON.
COMBINED EXCAVATING AND AMALGAMATING MACHINE.

No. 526,056. Patented Sept. 18, 1894.

WITNESSES:
Edward C. Rowland
John E. Lacey.

INVENTOR
Arthur W. Robinson
BY Phillips Abbott
ATTORNEY

UNITED STATES PATENT OFFICE.

ARTHUR W. ROBINSON, OF MILWAUKEE, WISCONSIN.

COMBINED EXCAVATING AND AMALGAMATING MACHINE.

SPECIFICATION forming part of Letters Patent No. 526,056, dated September 18, 1894.

Application filed November 23, 1893. Serial No. 491,751. (No model.)

*To all whom it may concern:*

Be it known that I, ARTHUR W. ROBINSON, a citizen of the United States, and a resident of Milwaukee, in the county of Milwaukee and State of Wisconsin, have invented a certain new and useful Combined Excavating and Amalgamating Machine, of which the following is a specification.

My invention has for its object the construction of a machine as an entirety, which shall combine an excavating apparatus, an amalgamating apparatus, and apparatus for disposing both the coarse and the fine tailings, together with all the accessories essential or desirable for the proper performance, by each set of apparatus, of the work done by it. Under the invention all of these mechanisms are erected upon or supported by a truck or car, or, for submarine work, a scow takes the place of the car, and sometimes, when the work is to be done in a fixed spot, the apparatus is erected within a suitable building.

The more prominent features of the invention are:—first, a solid bulk-head, which extends transversely across the structure or space occupied by the mechanism, and which divides the excavating or elevating devices from the amalgamating devices, and also affords support for both the excavator and its co-acting parts, and also for the parts which pass the material to the screen of the amalgamator; second, a peculiarly constructed chute and hopper for the transmission of the excavated or elevated material to the screen, and third, peculiarly constructed devices for disposing of the tailings, both the coarse ones from the screen, and the fine ones from the tank.

Figure 1:
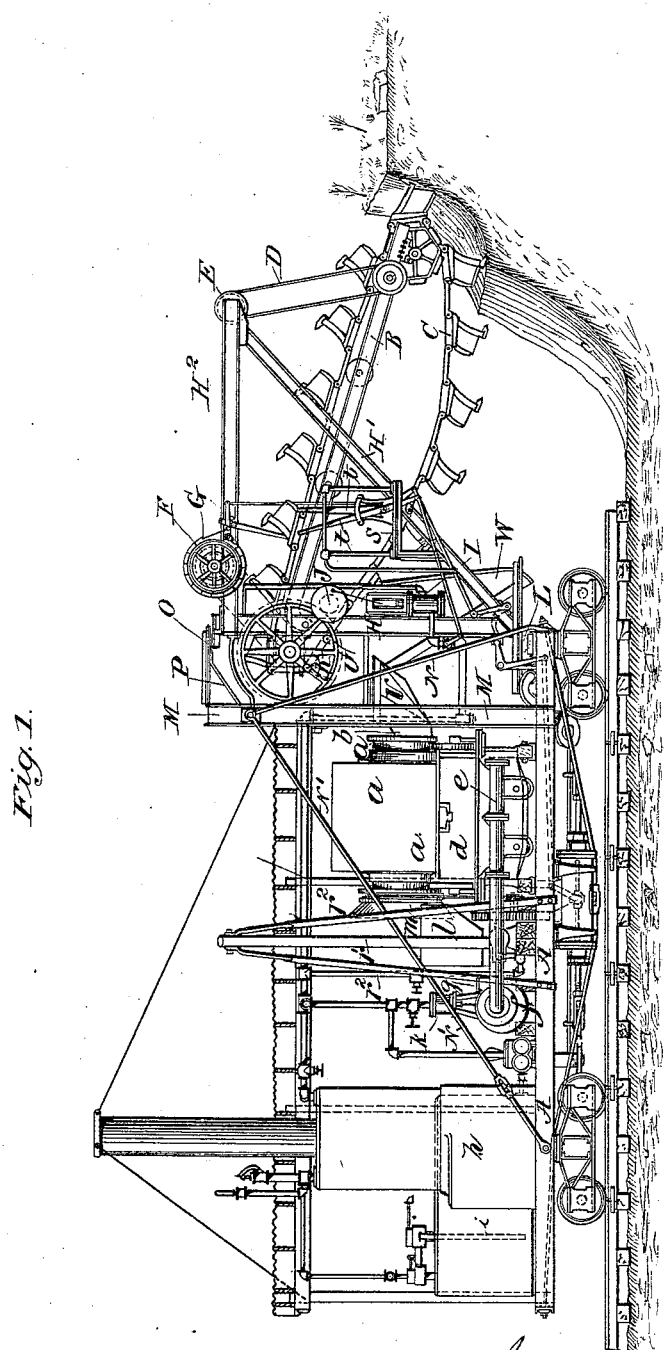
Figure 6:
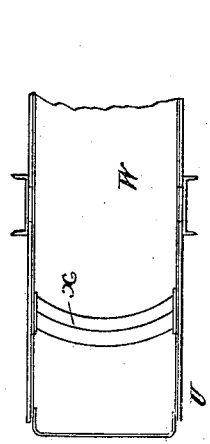
Figure 7:
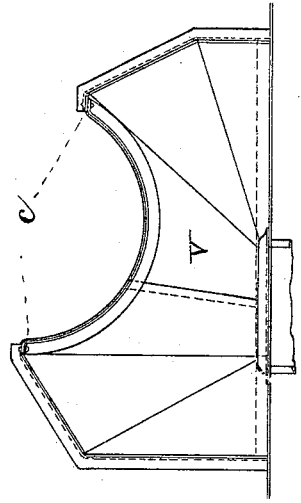
Figure 8:
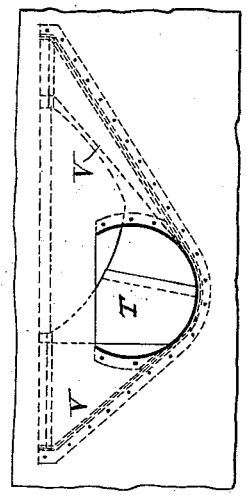
Figure 5:
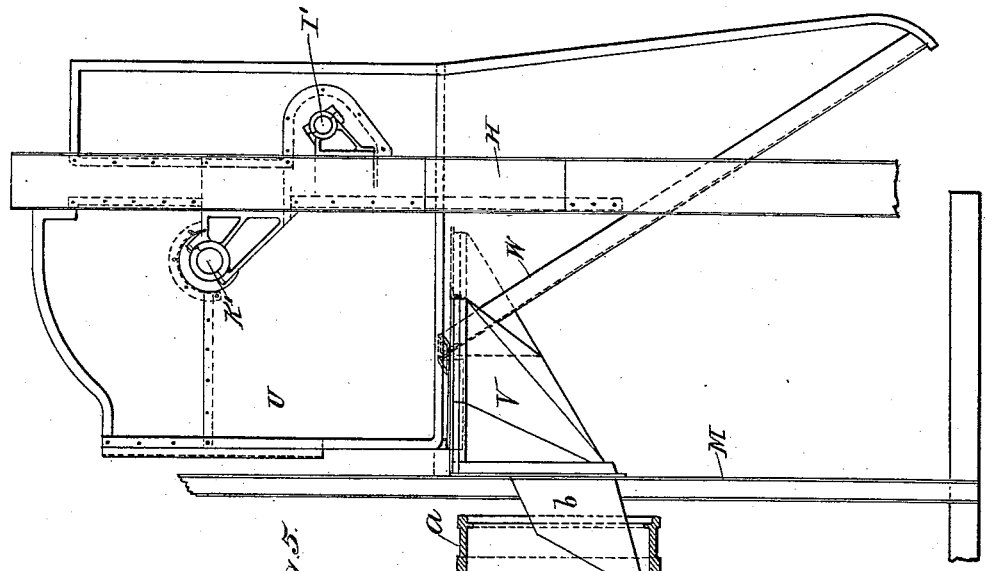

Referring to the drawings forming part hereof: Figure 1, illustrates an elevation of the machine as a whole. The form of amalgamator illustrated by me is the well known " double valley " form made by the Bucyrus Steam Shovel and Dredge Company, of South Milwaukee, Wisconsin; and substantially such in general construction as are described in the United States Letters Patent dated November 3, 1885, and numbered 329,832. Fig. 2, illustrates an elevation of the conveyer for disposing of the screen tailings. Fig. 3, illustrates an elevation of the front side of the bulk-head. Fig. 4, illustrates an elevation of the edge of the bulk-head, taken in the direction of the arrows on Fig. 3. Fig. 5, illustrates an elevation (parts being in section) of the chute and hopper, which transmit the material from the excavator or elevator to the screen. Figs. 6, 7 and 8, illustrate details of the parts shown in Fig. 5. Fig. 9, illustrates a plan view of the plate at the upper part of the bulkhead, which supports the upper end of the mast of the crane.

A illustrates the platform of a car, upon which the structure is erected.

B illustrates a boom, upon which a chain of buckets C operates in a well-known manner. The boom is elevated or depressed by chain or rope D, which passes over sheave E and thence back to a drum F, upon which the chain D is wound.

G is a friction device for controlling the movement of the drum.

H, H', H² is a crane, upon which the devices are supported.

I is a steam cylinder or engine, which actuates the driving pinion J, which is geared into the driving wheel of the chain bucket apparatus K.

All of the devices above described are mounted upon the crane or supported by it, and turn with the crane upon a common axis L.

M is the bulk-head, which extends across the platform of the car, from side to side, and forms a material feature of this invention. It is supported fore and aft by stay rods N, N', and at its upper end has a triangularly shaped horizontal plate O, which is supported by stay rods P. The construction of this bulk-head is best seen in Figs. 3 and 4. The triangular plate O is shown in Fig. 9.

$a''$ is the hub through which the mast projects and $b''$, $b''$ are flanges or angle iron strips which stiffen the plate. They may be formed on it, or made separately and bolted to it. $c''$ $c''$ show lateral extensions of these flanges, which may be employed in additionally securing the plate to the bulkhead.

Referring to Fig. 3: It will be seen that it comprises a rigid frame Q, preferably of channel iron, with cross stays R, which are also preferably channel or angle iron, and the space in between these stays and the side frame, is filled in solid with steel plates S, all but the opening at T, through which the material passes from the excavator to the amalgamator. That part of the apparatus will be hereinafter described. The purpose of having this bulkhead so solidly constructed, especially against lateral strain, is because it is relied upon to support and hold fast all of the excavator mechanism, and also the chute for the delivery of the excavated material into the amalgamator, and since these machines are inevitably subjected to exceedingly rough usage, it is essential that the parts stated should have a substantial, firm, reliable backing or foundation, upon which they are supported. Otherwise the machine very soon begins to rack and bolts are sheered off, or the mechanism gets out of alignment, and in a short time, the machine requires incessant repairs, which practically exhausts all profit in its use.

The chute, which delivers the material from the excavating apparatus to the revolving screen is best shown in Figs. 5, 6, 7 and 8. In Fig. 5, the mast of the crane is seen at H.

I' illustrates the axis for the driving gear I, shown in Fig. 1.

K' indicates the axis for the wheel K in Fig. 1. The material brought up by the bucket chain is, upon the tumbling of the buckets over the wheel K, delivered into a receptacle U, and well over toward the back side of that receptacle, so that it drops into the hopper V, but some portion of the excavated material, especially if the work be submarine, or in damp adhesive soil, is sure to cling to the buckets, and will not deliver from them, until they have proceeded somewhat on their return movement. Consequently in order to keep the machine and platform of the car clean and free from this dripping soil, I provide a chute W, which extends across the bottom of the receiver U, as at X, where it is provided with an upwardly projecting edge, which divides the material. All that which comes upon the left-hand side of that edge will drop into the hopper V, and that which falls upon the other side will slide down the chute W, and be delivered overboard and free from the machine. The chute W is fastened to the mast of the crane and revolves with it, but the hopper V is stationary, and is bolted to the bulk-head M.

The construction of the hopper V is peculiar, in order that it may receive the material from the buckets in all positions of the crane. The part of it, which delivers the material into the screen $a$, I call the delivery chute, and mark it $b$, and the part marked V is constructed as shown in Figs. 7 and 8, that is to say it is of such form as to receive the material from the buckets through an arc of about sixty degrees on one side of the center line and thirty degrees on the other side. It is made of this form for the following reasons: First. The orifice of the amalgamator is necessarily, in order to make the machine as compact and light and inexpensive as possible, about fifteen inches off the center line, and therefore, the hopper is divided equally from that point, and the amount of slope from either extremity of the hopper to the base of the orifice, where it connects with the delivery chute $b$ is the same; also, it is required that the crane should swing much farther to the right side of the machine than to the left, as all of the digging is ordinarily done on the side next to the bank, which is almost always the right-hand side. By reference to Fig. 7, it will be seen that the semi-circular forward edge of the hopper is struck from the center $c$ which is the axis of the crane, and by reference to Fig. 6, it will be seen that the receiver U has no bottom in it, and that the upper edge X of the chute W as shown, is arranged upon a circle coincident with that of the semi-circular front edge of the hopper. This arrangement of the devices is so that the crane may have an excessive swing on one side, and is a material improvement, because otherwise the construction of the entire apparatus would be uselessly heavy and expensive, and it would be practically impossible to make the proper arrangement of the hopper relative to the other parts. It will thus be seen that the bulk-head acts as a support or vertical foundation, so to speak, for the devices thus far referred to, and also that it is a partition, separating the excavating part of the mechanism from the amalgamator. This is an important feature, because in the event of fracture of any part of the excavating apparatus, which is apt to be attended with flying parts, the bulk-head protects the amalgamator and the engines and boiler, which are in the rear of it, from injury from these flying parts, and also it keeps, measurably at least, the dust and dirt incident to the excavating, from the amalgamator tank $d$.

$e$ is a draw-off suction pipe for the fine tailings from the valleys of the amalgamator. They are drawn away by a suction and delivery pump $f$, the discharge being through a pipe $g$, which operates upwardly and away to such point of delivery as desired, frequently several hundred feet away.

$h$ is the boiler and $i$ is the water tank. The pump $f$ is driven by a little engine $k$.

$l$ is a hopper, which receives the coarser tailings from the screen which are delivered at $m$. This hopper $l$ delivers into a chain bucket conveyer shown in Fig. 2 at $n$. The delivery orifice $m$ of the screen, is shown as revolving pretty nearly half its diameter in the hopper $l$. The chain bucket conveyer $n$ is supported upon a boom $o$, as usual, suitably supported by stay rods or chains $p, p'$. The boom is pivoted upon a suitable support at $q$, and is adapted to be elevated or depressed, by take-up mechanism $r$, so that the distance from the machine, at which the coarse tailings are to be delivered can be regulated. The take-up mechanism is made fast to the top of a mast $r'$, which is suitably supported by stay rods $r^2$. The machine as a whole, if upon a car or dredge is moved as the work progresses in any preferred manner, and the several parts of the machine receive motion from an engine or engines located as may be most convenient, all of which receive their steam from the boiler $h$. I prefer to actuate each separate mechanism by a little steam cylinder or engine, devoted to that special work. This, however, is a matter of convenience and preference, and I prefer also that all the mechanism shall be under the control of one man, excepting, of course, the man who runs the engines, and for this purpose, I provide a platform $s$, which is supported upon the mast and revolves with the crane, upon which the man can stand, and upon that platform I arrange levers $t, t$, &c., and foot pedals, if desired, whereby all the mechanism may be operated from that point. The details of the mechanical connections are not shown, since they form no essential part of the invention, and can be arranged in a number of different ways. In fact, I do not limit myself to the details of construction of any part of the mechanism, for the reason that those who are familiar with this art, will see at once that certain modifications may be made, without departing from the essential features of my invention.

The operation of the machine is obvious, and does not require any detailed description.

I claim—

1. The combination of a chain bucket excavator, engine and receiver, all mounted and swinging with the crane, and a hopper for conveying the material to the screen, constructed and arranged to receive the material through an arc of about sixty degrees on one side of the center line and about thirty degrees on the other side, substantially as and for the purposes set forth.

2. The combination of a chain bucket excavator engine and receiver, all mounted upon and swinging with the crane, and a hopper for conveying the material to the screen, mounted upon and delivering the material through a bulk-head, placed between the excavating apparatus and the amalgamating apparatus, substantially as and for the purposes set forth.

3. The combination of a chain bucket excavator engine and receiver, all mounted upon and swinging with the crane, and a hopper for conveying the material to the screen, mounted upon and delivering the material through a bulk-head, placed between the excavating apparatus and the amalgamating apparatus, said hopper being constructed and arranged to receive the material through an arc of about sixty degrees on one side of the center line and thirty degrees on the other side, substantially as and for the purposes set forth.

4. The combination of a chain bucket excavator, boom and co-acting parts, mounted upon a crane, a bulk-head in the rear thereof, which supports the upper end of the crane, a chute passing through the bulk-head, and which delivers the material to the amalgamator screen, the amalgamating apparatus itself having a suction and delivery apparatus for the fine tailings from the valleys of the machine and a conveyer for the discharge of the coarse tailings from the screen, substantially as and for the purposes set forth.

5. The combination of a chain bucket excavator, boom and co-acting parts, mounted upon a crane, a bulk-head in the rear thereof, which supports the upper end of the crane, said bulk-head being solid throughout excepting where the said hopper discharges through it, a chute passing through the bulk-head, and which delivers the material to the amalgamator screen, the amalgamating apparatus itself having a suction and delivery apparatus for the fine tailings from the valleys of the machine and a conveyer for the discharge of the coarse tailings from the screen, substantially as and for the purposes set forth.

Signed at Milwaukee, in the county of Milwaukee and State of Wisconsin, this 8th day of November, A. D. 1893.

ARTHUR W. ROBINSON.

Witnesses:
JOHN C. WILLIAMS,
J. G. DAVIS.